United States Patent
Chen (10) Patent No.: US 12,118,228 B2
(45) Date of Patent: Oct. 15, 2024

(54) DATA PROTECTION METHOD FOR MEMORIES AND MEMORY DEVICE THEREOF

(71) Applicant: YANGTZE MEMORY TECHNOLOGIES CO., LTD., Wuhan (CN)

(72) Inventor: Yonggang Chen, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 126 days.

(21) Appl. No.: 17/687,004

(22) Filed: Mar. 4, 2022

(65) Prior Publication Data

US 2023/0070503 A1     Mar. 9, 2023

Related U.S. Application Data

(63) Continuation of application No. PCT/CN2021/117127, filed on Sep. 8, 2021.

(51) Int. Cl.
    *G06F 3/06*      (2006.01)
(52) U.S. Cl.
    CPC .......... *G06F 3/0653* (2013.01); *G06F 3/0604* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 2017/0315867 A1* | 11/2017 | Yang | .................... G06F 11/1072 |
| 2019/0196903 A1 | 6/2019 | Yeh | |
| 2021/0049064 A1* | 2/2021 | Liang | ...................... G06F 3/065 |
| 2022/0222140 A1* | 7/2022 | Ji | ........................ G06F 11/1068 |

FOREIGN PATENT DOCUMENTS

| | | |
|---|---|---|
| CN | 101783955 A | 7/2010 |
| CN | 106469100 A | 3/2017 |
| CN | 107643882 A | 1/2018 |
| CN | 112558875 A | 3/2021 |
| CN | 113342566 A | 9/2021 |

OTHER PUBLICATIONS

International Search Report issued in corresponding International Application No. PCT/CN2021/117127, mailed on May 26, 2022, 5 pages.

\* cited by examiner

*Primary Examiner* — Khoa D Doan
*Assistant Examiner* — Edmund H Kwong
(74) *Attorney, Agent, or Firm* — BAYES PLLC (57) ABSTRACT

The present disclosure provides a system. The system includes a memory device and a controller. The memory device is configured to store memory data and includes a plurality of memory modules. Each of the memory modules includes a first memory block and a second memory block. The controller includes a processor and a memory. The controller is operatively coupled to the plurality of memory modules. In an operation on redundant array of independent disks (RAID), the controller is configured to generate a first check code based on memory data in the first memory block of the plurality memory modules, generate a second check code based on memory data in the second memory block of the plurality memory modules, and generate an additional check code based on the first check code and the second check code.

18 Claims, 5 Drawing Sheets

```
in a programming process of the memory,
generating a first check code based on data stored
in corresponding first memory blocks of each of
the plurality of memory modules and generating
a second check code based on data stored in
corresponding second memory blocks of each of
the plurality of memory modules
```
S410

```
after the programming process of the memory,
generating an additional check code based on the
first check code and the second check code,
wherein the additional check code is used to restore
data in one of the first memory blocks and the
second memory blocks of the plurality of memory
modules
```
S420

FIG.4

FIG.5

DATA PROTECTION METHOD FOR MEMORIES AND MEMORY DEVICE THEREOF

CROSS-REFERENCE TO RELATED APPLICATIONS

This application is continuation of International Application No. PCT/CN2021/117127, filed on Sep. 8, 2021, entitled "DATA PROTECTION METHOD FOR MEMORIES AND MEMORY DEVICE THEREOF," which is hereby incorporated by reference in its entirety.

BACKGROUND

The present disclosure generally relates to the field of data storage technology, particularly to a method for protecting data stored in the memory based on RAID and a memory device thereof.

RAID (Redundant Array of Independent Disks, RAID) is a disk array formed by combining a plurality of independent disks in various manners. RAID can provide error correction by data verification/mirror function, thereby enhancing security of data storage. Thus, RAID has been widely applied in fields of data storage and data protection.

In recent years, in order to further improve the bit density of flash memory devices and reduce their costs, three-dimensional (3D) NAND flash memory devices have been developed. However, in programming process of a 3D flash memory device, programming failure or data programming error might occur and therefore data cannot be read out from the 3D NAND flash memory device, resulting in data loss. With the RAID technology, it is possible to restore the lost data. Specifically, the lost data may be restored by executing the "XOR" operation on the data that has been programmed successfully and the check code obtained by all data to be programmed.

Figure 1:
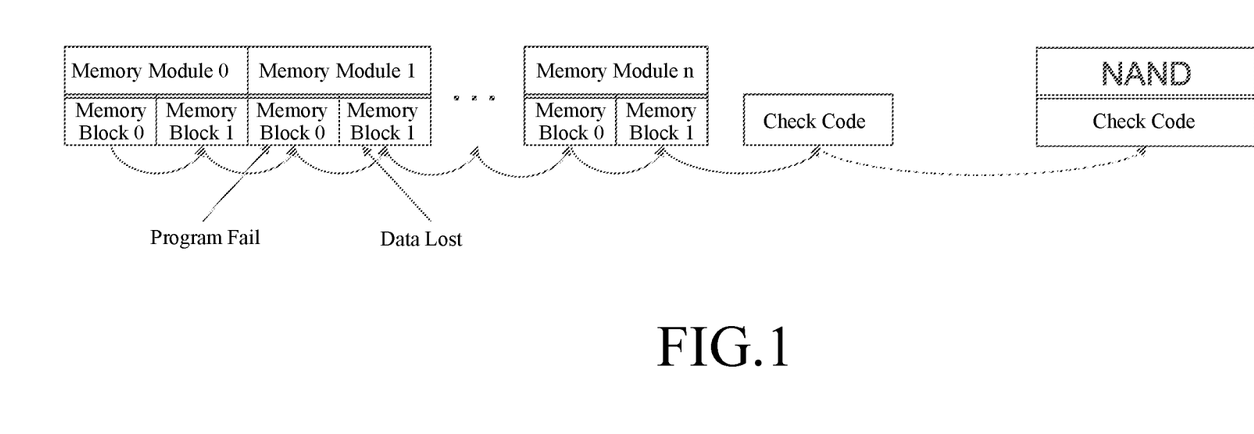
FIG. 1 illustrates a schematic diagram of a method that cannot restore data with one check code in case that data stored in two adjacent memory blocks of the same memory module is lost.

As shown in FIG. 1, a 3D NAND flash memory device may include n memory modules each including for example two memory blocks. In order to improve programming speed, it is possible to program a plurality of memory blocks in parallel at the same time. However, when programming of memory block 0 of memory module 1 fails, it may be accompanied by data loss of the adjacent memory block 1 of memory module 1. Since both memory blocks experience data loss, it is impossible to restore lost data with RAID technology if only one check code is generated.

Therefore, a data protection method for memories and memory device thereof are desired that can restore lost data when data stored in a plurality of memory blocks of a memory is lost.

SUMMARY

According to an embodiment of the present disclosure, there is provided a data protection method for a memory, the memory comprising a plurality of memory modules each including a first memory block and a second memory block, the method comprising: in the programming process of the memory, generating a first check code based on the data stored in corresponding first memory blocks of each of the plurality of memory modules and generating a second check code based on the data stored in corresponding second memory blocks of each of the plurality of memory modules; and generating an additional check code based on the first check code and the second check code after the programming process of the memory, wherein the additional check code is used to restore data in one of the first memory block and the second memory block of the plurality of memory modules.

In some embodiments, the memory module is a memory die or a memory plane.

In some embodiments, the first memory block and the second memory block of each memory module are physically adjacent memory blocks.

In some embodiments, the first check code is generated by executing XOR operation on data stored in corresponding first memory blocks of each of the plurality of memory modules, the second check code is generated by executing XOR operation on data stored in corresponding second memory blocks of each of the plurality of memory modules, and the additional check code is generated by executing XOR operation on the first check code and the second check code.

In some embodiments, the method further includes storing the additional check code into the memory.

In some embodiments, the memory is a 3D NAND flash memory.

In some embodiments, the method further includes a step of restoring, with the additional check code and unlost data stored in the first memory blocks and the second memory blocks of the plurality of memory modules, data stored in one memory block of the first memory blocks and the second memory blocks of the plurality of memory modules, in case that data stored in the one memory block is lost.

In some embodiments, before storing the additional check code into the memory, the first check code and the second check code are stored into corresponding cache.

In some embodiments, the method further includes a step of deleting the first check code and the second check code from the cache after storing the additional check code into the memory.

In some embodiments, the method further includes a step of: before deleting the first check code and the second check code from the cache, restoring data of one or more memory blocks of the first memory blocks and the second memory blocks of the plurality of memory modules based on RAID technology and using the first check code and the second check code.

According to an embodiment of the present disclosure, there is provided a memory system including: a memory comprising a plurality of memory modules each including a first memory block and a second memory block; and a controller connected to the memory and configured to: in the programming process of the memory, generate a first check code based on the data stored in corresponding first memory blocks of each of the plurality of memory modules and generate a second check code based on the data stored in corresponding second memory blocks of each of the plurality of memory modules; and generate an additional check code based on the first check code and the second check code after the programming process of the memory, wherein the additional check code is used to restore data in one of the first memory blocks and the second memory blocks of the plurality of memory modules.

In some embodiments, the memory module is a memory die or a memory plane.

In some embodiments, the first memory block and the second memory block of each memory module are physically adjacent memory blocks.

In some embodiments, the controller is configured to generate the first check code by executing XOR operation on data stored in corresponding first memory blocks of each of the plurality of memory modules, generate the second check code by executing XOR operation on data stored in corresponding second memory blocks of each of the plurality of memory modules, and generate the additional check code by executing XOR operation on the first check code and the second check code.

In some embodiments, the controller is further configured to store the additional check code into the memory.

In some embodiments, the memory is a 3D NAND flash memory.

In some embodiments, the controller is configured to restore, with the additional check code and unlost data stored in the first memory blocks and the second memory blocks of the plurality of memory modules, data stored in one memory block of the first memory blocks and the second memory blocks of the plurality of memory modules, in case that data stored in the one memory block is lost.

In some embodiments, the controller is further configured to store the first check code and the second check code into corresponding cache before storing the additional check code into the memory.

In some embodiments, the controller is further configured to delete the first check code and the second check code from the cache after storing the additional check code into the memory.

In some embodiments, the controller is further configured to, before deleting the first check code and the second check code from the cache, restore data of one or more memory blocks of the first memory blocks and the second memory blocks of the plurality of memory modules based on RAID technology and using the first check code and the second check code.

According to an embodiment of the present disclosure, there is provided a computer readable storage medium having stored thereon program codes which, when executed by a processor; enable the processor to carry out the method as described in the present disclosure.

BRIEF DESCRIPTION OF THE DRAWINGS

Accompanying drawings, which are incorporated herein and form a part of the description, illustrate embodiments of the present disclosure and, together with the description, further serve to explain the principles of the present disclosure and enable those skilled in the art to make and use the present disclosure.

DETAILED DESCRIPTION

The subject matter described herein will be discussed now with reference to example implementations. It should be understood that these implementations are discussed only for the purpose of enabling those skilled in the art to better understand and in turn implement the subject matter described herein rather than limiting the protection scope, application or examples set forth in claims. The functions and arrangements of elements discussed may be modified without departing from the scope of the present disclosure. Various processes or components may be omitted, replaced and added as desired for various examples. For example, the described method may be executed in an order different from the described order and various steps may be added, omitted or combined. Additionally, features described with respect to some examples may also be combined in other examples.

It is to be noted that references to "one embodiment", "an embodiment" and "some embodiments" in the description means the described embodiments may include a particular feature, structure or characteristic, but every embodiment may not necessarily include the particular feature, structure or characteristic. Moreover, such phrases do not necessarily refer to the same embodiment. In addition, when a particular feature, structure or characteristic is described in connection with an embodiment, it would be within the knowledge of a person skilled in the pertinent art to affect such feature, structure or characteristic in connection with other implementations explicitly or not explicitly described.

While embodiments of the present disclosure will be described with reference to 3D NAND flash memory devices, it should be understood that the innovative concepts of the present disclosure should not be limited thereto. For example, without departing from the scope of the present disclosure, the present disclosure is applicable to other nonvolatile memory devices such as electrically erasable programmable ROM (EEPROM), NOR flash, phase change RAM (PRAM), magnetic RAM (MRAM), resistive RAM (RRAM), and ferroelectric RAM (FRAM), etc.

Figure 2:
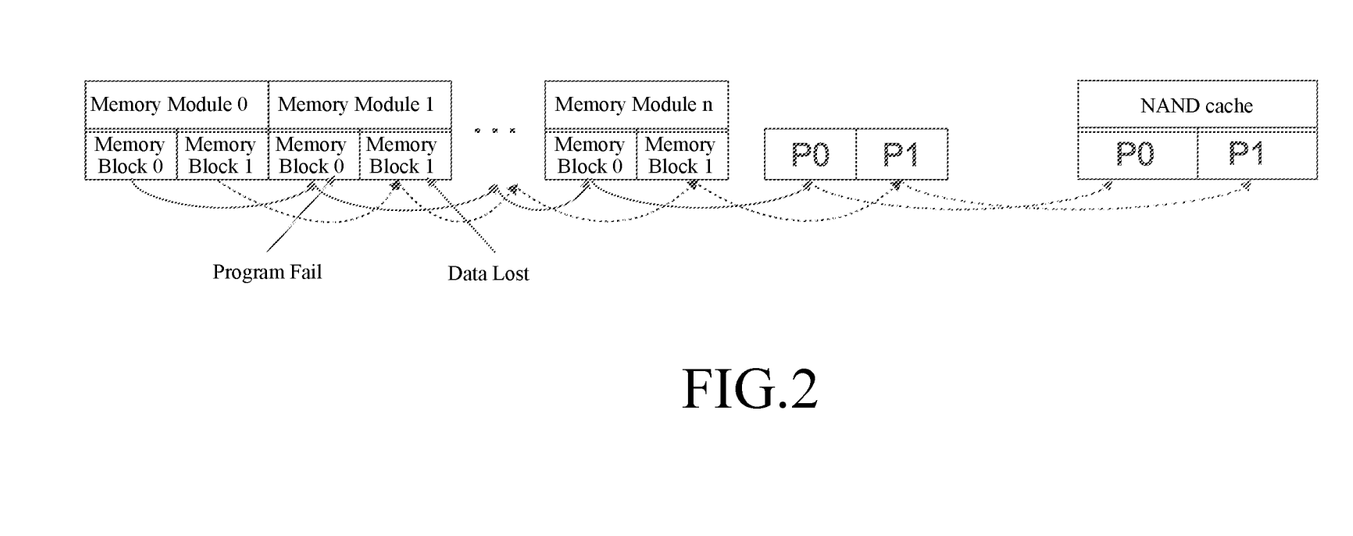
FIG. 2 illustrates a schematic diagram of a data protection method for memories according to an embodiment of the present disclosure.

FIG. 2 illustrates a schematic diagram of a data protection method for memories according to an embodiment of the present disclosure. As shown in FIG. 1, a 3D NAND flash memory device includes n memory modules each including for example two memory blocks. Similarly, when programming of memory block 0 of memory module 1 fails, it may be accompanied by data loss of the adjacent memory block 1 of memory module 1. However, it is different from FIG. 1 in that a check code P0 is generated using data stored in memory block 0 of memory module 0, memory block 0 of memory module 1, . . . memory block 0 of memory module n, and another check code P1 is generated at the same time using data stored in memory block 1 of memory module 0, memory block 1 of memory module 1, . . . memory block 1 of memory module n. It is possible to restore the lost data in memory block 0 of memory module 1 with the check code P0 and the unlost data stored in memory block 0 of memory module 0, memory block 0 of memory module 2, memory block 0 of memory module 3, . . . memory block 0 of memory module n; and it is possible to restore the lost data in memory block 1 of memory module 1 with the check code P1 and the unlost data stored in memory block 1 of memory module 0, memory block 1 of memory module 2, memory block 1 of memory module 3, . . . memory block 1 of memory module n. However, in this case, a large storage space may be occupied for storing check codes P0 and P1. In case of limited memory, it may be desired to store check codes P0 and P1 into the 3D NAND flash memory cache, which will result in significant writing and reading operation of the NAND flash memory cache, thereby impacting data storage speed severely.

Figure 3:
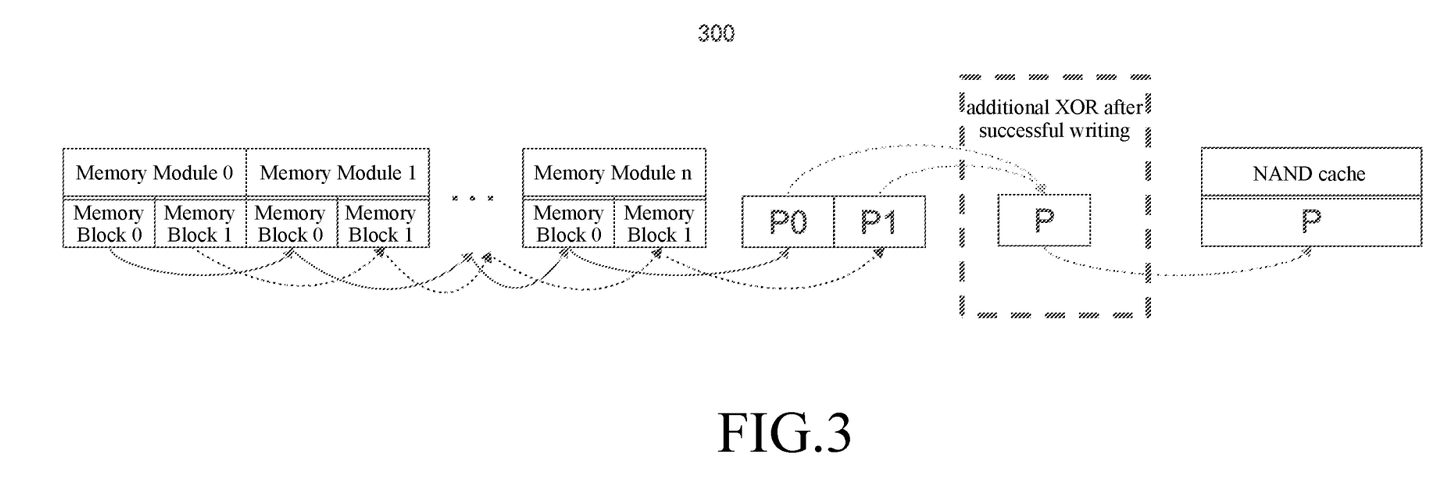
FIG. 3 illustrates a schematic diagram of a data protection method for memories according to another embodiment of the present disclosure.

FIG. 3 illustrates a schematic diagram of a data protection method 300 for memories according to yet another embodiment of the present disclosure. As shown in FIG. 3, the 3D NAND flash memory device includes memory module 0, memory module 1, memory module 2 . . . , and memory module n. Each memory module includes for example memory block 0 and memory block 1.

While programming a plurality of memory blocks in a plurality of memory modules of the 3D NAND flash memory device in parallel, programming failure of one memory block sometimes may cause data loss of another memory block physically adjacent thereto and in the same memory module. For example, programing failure of memory block 0 of memory module 1 may cause data loss of memory block 1 (physically adjacent to memory block 0) in the memory module 1.

In an embodiment, in order to restore lost data (for example data loss due to programming error in the programming process) in memory block 0 and memory block 1 of memory module 1 at the same time with RAID technology, as shown in FIG. 2, a check code P0 is generated based on data stored in memory block 0 of memory module 0, memory block 0 of memory module 1, memory block 0 of memory module 2, . . . and memory block 0 of memory module n. In addition, another check code P1 is generated based on data stored in memory block 1 of memory module 0, memory block 1 of memory module 1, memory block 1 of memory module 2, . . . and memory block 1 of memory module n. That is, different check codes such as P0 and P1 are prepared for the first memory blocks on a plurality of memory modules and the corresponding second memory blocks on the plurality of memory modules, a first memory block and a second memory block may be arranged to be physically adjacent to each other on a memory module. In an embodiment, the check codes P0, P1 generated in the programming process may be temporarily stored in respective cache and occupy certain cache space. It should be appreciated that before deleting the check codes P0, P1 temporarily stored in the cache, similar to the method of the embodiment shown in FIG. 2, it is possible to restore the lost data in memory block 0 and memory block 1 in one memory module of n memory modules using the check codes P0, P1 generated in the programming process and the unlost data stored in memory blocks 0 and memory blocks 1 of n memory modules.

In an embodiment, a check code P0 may be generated by executing "XOR" operation on data stored in memory block 0 of memory module 0, memory block 0 of memory module 1, memory block 0 of memory module 2, . . . and memory block 0 of memory module n, and a check code P1 may be generated by executing "XOR" operation on data stored in memory block 1 of memory module 0, memory block 1 of memory module 1, memory block 1 of memory module 2, . . . and memory block 1 of memory module n. "XOR" operation may be a logic operation on two operands in which a logic value "1" is generated if the two values undergoing "XOR" operation are different; and a logic value "0" is generated if the two values undergoing "XOR" operation are identical. For example, if data stored in memory block 0 of memory module 0 is "11001010", and data stored in memory block 0 of memory module 1 is "10000011", the result of "XOR" operation is "01001001". Next, an "XOR" operation is executed again on the above result and the data stored in memory block 0 of memory module 2. After n−2 "XOR" operations have been executed, an "XOR" operation is executed again on the result and the data stored in memory block 0 of memory module n to calculate the check code P0 for the corresponding memory block 0 of the n memory modules. Similarly, it is possible to obtain the check code P1 for the corresponding memory blocks 1 of the n memory modules.

The inventors found out that the programming failure of one memory block may cause data loss of another memory block which is physically adjacent thereto and in the same memory module. Such data loss typically occurs in the programming process. In a case that a programming for a 3D NAND flash memory device is completed, even if for example a memory block in the 3D NAND flash memory device (such as memory block 0 of memory module 1) experiences data loss due to the elapse of time in data retention phase, such data loss in the memory block will not cause loss of data stored in another memory block physically adjacent thereto and in the same memory module (such as memory block 1 in the memory module 1). Accordingly, in the data retention phase of a 3D NAND flash memory device, data loss occurs in at most one memory block.

In view of this, the method of the embodiment shown in FIG. 3 differs from that shown in FIG. 2 in that an additional check code P is further generated based on check code P0 and check code P1 in a programming process or after the programming process is completed. Lost data of one memory block in the data retention phase can be restored with the additional check code P and the unlost data stored in memory blocks 0 and memory blocks 1 of then memory modules. In an embodiment, the additional check code P can also be generated by executing "XOR" operation on check codes P0 and P1. After generating the additional check code P, it may be stored into the 3D NAND flash memory cache. In one embodiment, after storing the additional check code P into the 3D NAND flash memory cache, it is possible to delete the temporarily stored first check code P0 and second check code P1 from the cache.

In the method 300 according to the embodiment shown in FIG. 3, in the programming process of the 3D NAND flash memory device, even if the programming failure of for example memory block 0 of memory module 1 causes data loss in memory block 1 of memory module 1, it is possible to restore the lost data in memory block 0 and memory block 1 of memory module 1 due to the existence of check codes P0 and P1. In addition, the additional check code P can be obtained based on check code P0 and check code P1 by adding an "XOR" operation, it is possible to restore data lost in one memory block with the additional check code P and the unlost data stored in memory blocks 0 and memory blocks 1 of n memory modules after the programming operation is completed and significantly decreases the amount of check code data that needs to be stored, thereby reducing corresponding space demand for e.g., memory. In case that it is desired to store the additional check code P into the 3D NAND flash memory cache, it will significantly reduce the number of times for reading and writing of the 3D NAND flash memory cache, hence improving system performance and reducing device wear.

In the method shown in FIG. 3, each memory module includes two memory blocks, namely memory block 0 and memory block 1. However, for those skilled in the art, each memory module may include a plurality of memory blocks. For example, each memory module may include memory block 0, memory block 1, memory block 2, . . . and memory block n. In this case, it is possible to execute an "XOR" operation for respective memory blocks of memory module 0 to memory module n to obtain n check codes such as P0, P1, P2, . . . and Pn. For example, check code P0 may be generated by executing "XOR" operations successively on data stored in memory block 0 of memory module 0, memory block 0 of memory module 1, memory block 0 of memory module 2, . . . and memory block 0 of memory module n; check code P1 may be generated by executing "XOR" operations successively on data stored in memory block 1 of memory module 0, memory block 1 of memory module 1, memory block 1 of memory module 2, . . . and memory block 1 of memory module n; . . . , and check code Pn may be generated by executing "XOR" operations successively on data stored in memory block n of memory module 0, memory block n of memory module 1, memory block n of memory module 2, . . . and memory block n of memory module n. Then, an "XOR" operation may be executed on check codes P0, P1, P2, . . . and Pn to generate the additional check code P.

In the method shown in FIG. 3, the memory modules may be memory planes each of which may include a plurality of memory blocks. In one embodiment, the 3D NAND flash memory device may include for example four memory planes, and each memory plane may include for example six memory blocks. Each memory block may include a plurality of memory cells that may be arranged in form of vertical memory strings in which each of memory cells may be addressed by interconnections such as bit lines and word lines. In another embodiment, the memory module may also be a memory die.

Figure 4:
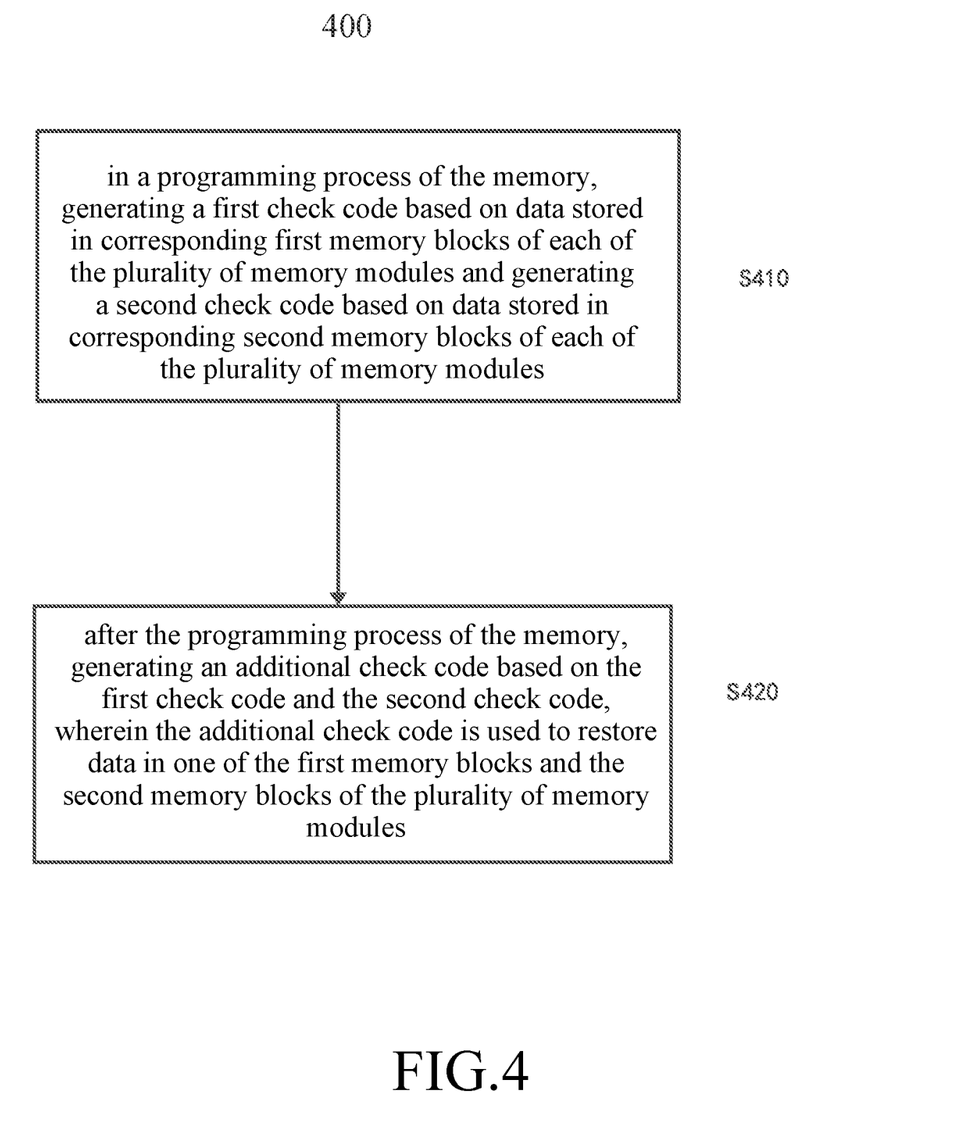
FIG. 4 illustrates a flow chart of a data protection method for memories according to yet another embodiment of the present disclosure.

FIG. 4 illustrates a flow chart of a data protection method 400 for memories according to an embodiment of the present disclosure, the memory includes a plurality of memory modules each including a first memory block and a second memory block. As shown in FIG. 4, the method 400 includes: in the programming process of the memory, generating a first check code based on the data stored in corresponding first memory blocks of each of the plurality of memory modules and generating a second check code based on the data stored in corresponding second memory blocks of each of the plurality of memory modules (step S410); and generating an additional check code based on the first check code and the second check code after the programming process of the memory, wherein the additional check code is used to restore data in one of the first memory blocks and the second memory blocks in the plurality of memory modules (step S420). Steps 410 and 420 will be described below.

Step S410: in the programming process of the memory, generating a first check code based on data stored in corresponding first memory blocks of each of the plurality of memory modules and generating a second check code based on data stored in corresponding second memory blocks of each of the plurality of memory modules. Still referring to the method shown in FIG. 3 as an example, in the programming process, in case that each of the memory module 0, memory module 1, memory module 2, . . . and memory module n includes two memory blocks such as memory block 0 and memory block 1, check code P0 is generated by executing "XOR" operation based on data stored in memory block 0 of memory module 0, memory block 0 of memory module 1, memory block 0 of memory module 2, . . . and memory block 0 of memory module n; and check code P1 is generated by executing "XOR" operation based on data stored in memory block 1 of memory module 0, memory block 1 of memory module 1, memory block 1 of memory module 2, . . . and memory block 1 of memory module n. It is appreciated that in case that each of the memory module 0, memory module 1, memory module 2, . . . and memory module n includes n memory blocks, n check codes P0, P1, P2, . . . and Pn may be generated based on similar method.

In an embodiment, the first memory block and the second memory block such as memory block 0 and memory block 1 of each memory module are physically adjacent memory blocks.

Step S420: after the programming process of the memory, generating an additional check code based on the first check code and the second check code, wherein the additional check code is used to restore data in one of the first memory blocks and the second memory blocks of the plurality of memory modules. Still referring to the method shown in FIG. 3 as an example, after the programming process, the additional check code P is generated by executing "XOR" operation on check code P0 and check code P1. It is appreciated that in case that each of memory module 0, memory module 1, memory module 2, . . . and memory module n includes n memory blocks, for example, it is possible to generate an additional check code P by executing "XOR" operation on check code P0, check code P1, check code P2, . . . and check code Pn.

In an embodiment, the method further includes storing the additional check code P into the 3D NAND flash memory device. For example, partial regions of the memory array of the 3D NAND flash memory may be determined in advance to be the cache region for storing the additional check code.

In one embodiment, it is possible to restore lost data in one memory block of the memory after programming process based on the generated additional check code P and the unlost data stored in the first memory blocks and the second memory blocks of the plurality of memory modules. For example, still referring to the method shown in FIG. 3 as an example, it is assumed that data stored in memory block 0 of memory module 1 is lost after the programming process. In order to restore data lost in memory block 0 of memory module 1, it is possible to first execute "XOR" operation on the generated additional check code P and the data stored in memory block 1 of memory module n, then "XOR" operation is executed on the result and data stored in memory block 1 of memory module n−1, and so on, until "XOR" operation is executed again on result of the successively executed "XOR" operations and data stored in memory block 1 of memory module 0, then "XOR" operation is executed on the result of the n "XOR" operations and data stored in memory block 0 of memory module n, then "XOR" operation is executed on the result and data stored in memory block 0 of memory module n−1, and so on, until "XOR" operation is executed again on result of the successively executed "XOR" operations and data stored in memory block 0 of memory module 2, thereby obtaining the final result of the above overall 2n−2 "XOR" operations, which is also the result of "XOR" operation on data stored in memory block 0 of memory module 0 and data stored in memory block 0 of memory module 1. Therefore, it is possible to restore data lost in memory block 0 of memory module 1 after programming process with the additional check code P generated based on the first check code P0 and the second check code P1. It is appreciated that in case that each of the memory module 0, memory module 1, memory module 2, . . . and memory module n includes n memory blocks, data lost in one memory block of the memory after the programming process may be restored based on similar method.

Figure 5:
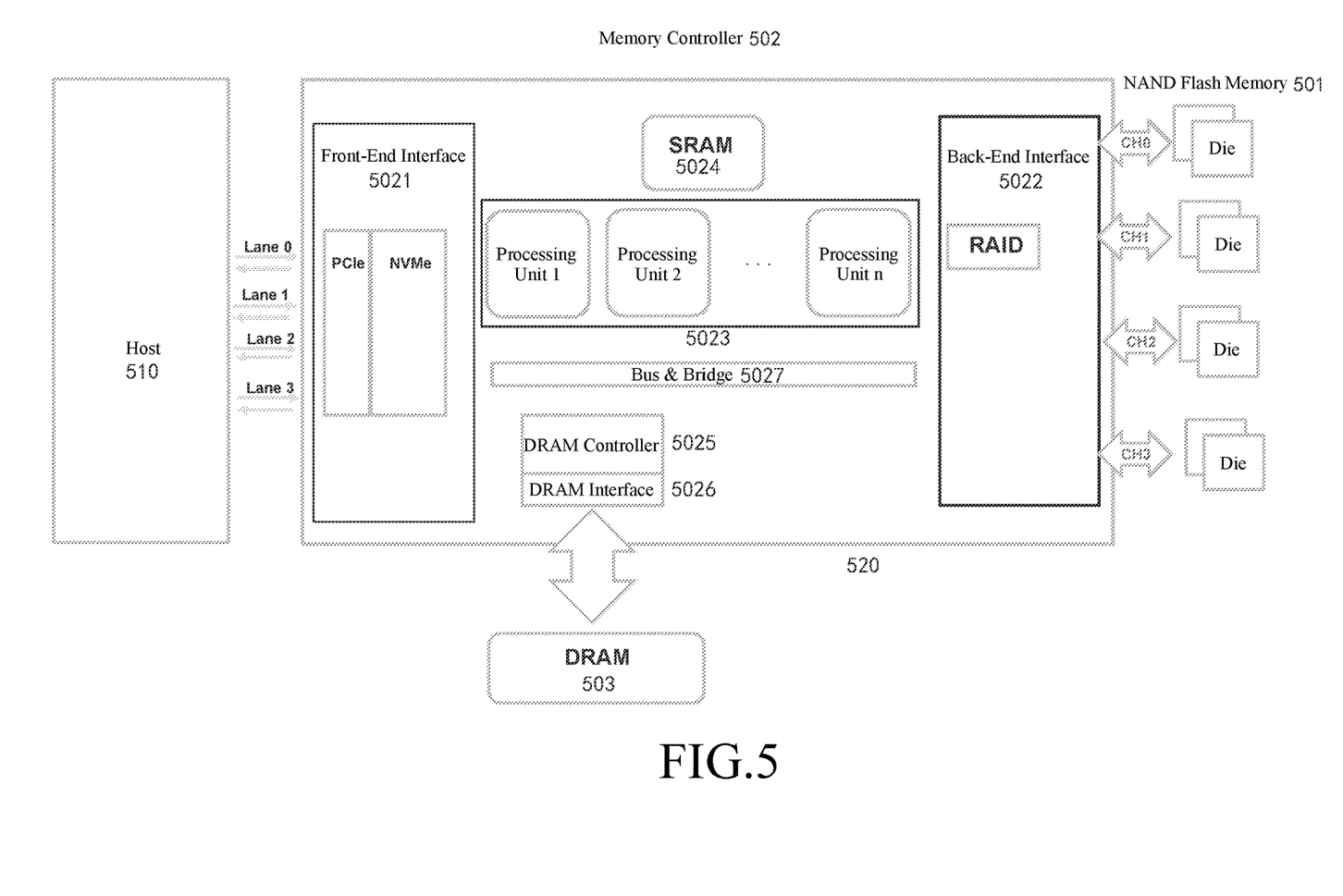
FIG. 5 illustrates a schematic diagram of a memory system according to an embodiment of the present disclosure.

FIG. 5 illustrates a schematic diagram of a system 500 with a memory according to an embodiment of the present disclosure. The system 500 may be a mobile phone, a desktop computer, a laptop computer, a tablet computer, a game console, a printer, a positioning equipment, a wearable electronic device, a smart sensor, a virtual reality (VR)

device, an augmented reality (AR) device or any other suitable electronic devices with memories. As shown in FIG. 5, system 500 may include a host 510 and a memory system 520 having one or more memories 501 and a memory controller 502. The host 510 may be configured to send data to the memory 501 or receive data from the memory 501.

The memory 501 may be any memory disclosed herein, such as the 3D NAND flash memory including a plurality of memory modules such as memory dies and each memory module includes a first memory block and a second memory block, as described in detail above.

As illustrated in FIG. 5, the memory controller 502 includes a front-end interface 5021 coupled to the host 510 through passages Lane 0, Lane 1, Lane 2 and Lane 3 and a back-end interface 5022 coupled to the memory 501 through passages CH1, CH2, CH3 and CH4, wherein the front-end interface 5021 may communicate with the host 510 according to certain communication protocols such as PCIe, NVMe and the back-end interface 5022 includes a RAID module configured to, in the programming process of the memory 501, generate a first check code based on data stored in corresponding first memory blocks of each of the plurality of memory modules of the memory 501 and generate a second check code based on data stored in corresponding second memory blocks of each of the plurality of memory modules; and after the programming process of the memory 501, generate an additional check code based the first check code and the second check code to restore lost data of one memory block of the memory 501. Specifically, the RAID module may be implemented by the firmware written into for example the controller of the back-end interface 5022.

The memory controller 502 further includes a processing module 5023 having a processing unit 1, a processing unit 2, ... and a processing unit n. The individual processing unit may be configured with corresponding firmware such as one implementing FTL (Flash to Logic) function for controlling operations such as reading, erasing and programming of the memory 501 based on the received instructions from the host 510. The memory controller 502 further includes a static random access memory (SRAM) 5024, a dynamic random access memory (DRAM) controller 5025 and a dynamic random access memory (DRAM) interface 5026, wherein the dynamic random access memory (DRAM) interface 5026 is coupled to the dynamic random access memory (DRAM) 503. As illustrated in FIG. 5, various components of the memory controller 502 may be connected to the bus & bridge 5027.

As noted above, the memory system 520 according to an embodiment of the present disclosure can restore data lost in a plurality of memory blocks in the programming process of the memory 501. Furthermore, after the programming process of the memory 501, one "XOR" operation on check codes obtained based on the first memory blocks on the plurality of memory modules and the corresponding second memory blocks on the plurality of memory modules, respectively, is added, thereby restoring data lost in one memory block of the memory 501 in the data retention phase and significantly reducing the amount of check code data that needs to be stored, reducing corresponding space demand for e.g. memory. In case that it is desired to store check code data into the memory cache, it will significantly reduce number of times for reading and writing of the memory cache, thereby improving system performance and reducing device wearing.

According to one embodiment, there is provided a computer readable storage medium having a program code stored thereon, when it is executed by a processor; enable the processor to carry out the operations and functions of embodiments described in the description with respect to FIGS. 2-3. In particular, it may be provided a system or a device configured with readable storage medium having software program code stored thereon for implementing functions of any embodiment of the above described embodiments and enabling the computer or processor of the system or device to read and execute instructions stored in the readable storage medium.

Embodiments of the readable storage medium include non-volatile storage card and ROM. Optionally, it is possible for the communication network to download program codes from the server computer or cloud.

It is to be noted that in the above-described flowcharts and system structure diagrams, not all steps and units are necessary, and some steps or units may be omitted according to practical demand. The order in which steps are carried out is not fixed and may be determined as desired. The device structures described in the above embodiments may be physical structures or logic structures. That is, some units may be implemented with the same physical entity, or some units may be implemented with a plurality of physical entities or may be implemented with some components in a plurality of independent devices together.

The controller has been described with reference to various devices and methods. The controller may be implemented with electronic hardware, computer software or any combination thereof. Whether the controller is implemented as hardware or software depends on specific applications and overall design constrains imposed on the system. As an example, the controller, any part of the controller or any combination of controllers presented in this disclosure may be implemented as a microprocessor, a microcontroller, a digital signal processor (DSP), a field programmable gate array (FPGA), a programmable logic device (PLD), a state machine, a gate logic, a discrete hardware circuitry and any other suitable processing component configured to implement functions described in this disclosure. Functions of the controller, any part of the controller or any combination of controllers presented in this disclosure may be implemented as software executed by a microprocessor, a microcontroller, a DSP or other suitable platform.

The above description of the present disclosure has been provided to enable those of ordinary skill in the art to implement or use contents of the present disclosure. For those of ordinary skill in the art, it is obvious to make various modifications to the present disclosure and it is also possible to apply the general principle as defined herein to other variants without departing from the scope of the present disclosure. Therefore, the present disclosure is not limited to the examples and designs as described herein, but is consistent with the broadest scope according to the principle and novel features disclosed herein.

What is claimed is:

1. A system, comprising:
 a memory device configured to store memory data, the memory device comprising a plurality of memory modules, each memory module of the plurality of memory modules comprising a first memory block and a second memory block, and
 a controller, comprising a processor and a memory, operatively coupled to the plurality of memory modules and configured to, in an operation on redundant array of independent disks (RAID)
  perform a programming process of the plurality of memory modules;

generate a first check code based on memory data in the first memory block of the plurality of memory modules;
generate a second check code based on memory data in the second memory block of the plurality of memory modules;
generate a single additional check code associated with the memory data in the first memory block of the plurality of memory modules and the memory data in the second memory block of the plurality of memory modules, the single additional check code being generated based on the first check code and the second check code, and the single additional check code being associated with all memory data in the plurality of memory modules;
identify memory data is lost in one memory block in the plurality of memory modules; and
in response to the memory data being lost in the one memory block in the plurality of memory modules, restore lost memory data using the single additional check code and unlost data in the plurality of memory modules.

2. The system of claim 1, wherein the controller is configured to generate the first check code and the second check code in a programming process of the plurality of memory modules.

3. The system of claim 2, wherein the controller is configured to generate the single additional check code after the programming process of the plurality of memory modules.

4. The system of claim 1, wherein the controller is configured to:
perform an XOR operation on the memory data in the first memory block of the plurality of memory modules to generate the first check code;
perform an XOR operation on the memory data in the second memory block of the plurality of memory modules to generate the second check code; and
perform an XOR operation on the first check code and the second check code to generate the single additional check code.

5. The system of claim 1, wherein to restore the lost memory data, the controller is configured to perform an XOR operation on the single additional check code and the unlost data in the plurality of memory modules.

6. The system of claim 1, wherein the controller is further configured to delete the first check code and the second check code after restoring the lost memory data.

7. The system of claim 1, wherein the first memory block and the second memory block of each of the plurality of memory modules are physically adjacent to each other.

8. The system of claim 1, wherein the controller is further configured to:
store the first check code and the second check code into respective caches before generating the single additional check code.

9. The system of claim 1, wherein the controller is further configured to:
store the single additional check code in a respective cache; and
delete the first check code and the second check code after storing the single additional check code.

10. The system of claim 1, wherein the plurality of memory modules are each located in a memory die or a memory plane.

11. The system of claim 1, wherein the memory device comprises a three-dimensional (3D) NAND flash memory.

12. A method for operating a memory apparatus using redundant array of independent disks (RAID), the method comprising:
performing, by a memory controller, a programming process of a plurality of memory modules, each memory module of the plurality of memory modules comprising a first memory block and a second memory block;
generating, by the memory controller, a first check code based on memory data in the first memory block of the plurality of memory modules;
generating, by the memory controller, a second check code based on memory data in the second memory block of the plurality of memory modules;
generating, by the memory controller, a single additional check code associated with the memory data in the first memory block of the plurality of memory modules and the memory data in the second memory block of the plurality of memory modules, the single additional check code being generated based on the first check code and the second check code, and the single additional check code being associated with all memory data in the plurality of memory modules;
identifying, by the memory controller, memory data is lost in one memory block in the plurality of memory modules; and
in response to the memory data being lost in the one memory block in the plurality of memory modules, restoring, by the memory controller, lost memory data using the single additional check code and unlost data in the plurality of memory modules.

13. The method of claim 12, comprising generating the first check code and the second check code in a programming process of the plurality of memory modules.

14. The method of claim 13, comprising generating the single additional check code after the programming process of the plurality of memory modules.

15. The method of claim 12, comprising:
performing, by the memory controller, an XOR operation on the memory data in the first memory block of the plurality of memory modules to generate the first check code;
performing, by the memory controller, an XOR operation on the memory data in the second memory block of the plurality of memory modules to generate the second check code; and
performing, by the memory controller, an XOR operation on the first check code and the second check code to generate the single additional check code.

16. The method of claim 12, wherein restoring the lost memory data comprising performing an XOR operation on the single additional check code and the unlost data in the plurality of memory modules.

17. The method of claim 12, further comprising deleting the first check code and the second check code after restoring the lost memory data.

18. A memory controller, comprising:
a processor; and
a memory storing instructions, which when executed by the processor, cause the processor to, in an operation on redundant array of independent disks (RAID),
perform a programming process of a plurality of memory modules, each memory module of the plurality of memory modules comprising a first memory block and a second memory block;

generate a first check code based on memory data in a first memory block of a plurality of memory modules;

generate a second check code based on memory data in a second memory block of the plurality of memory modules;

generate a single additional check code associated with the memory data in the first memory block of the plurality of memory modules and the memory data in the second memory block of the plurality of memory modules, the single additional check code being generated based on the first check code and the second check code, and the single additional check code being associated with all memory data in the plurality of memory modules;

identify memory data is lost in one memory block in the plurality of memory modules; and in response to the memory data being lost in the one memory block in the plurality of memory modules, restore lost memory data using the single additional check code and unlost data in the plurality of memory modules.

\* \* \* \* \*